(12) United States Patent
Cheriton

(10) Patent No.: US 10,061,629 B2
(45) Date of Patent: Aug. 28, 2018

(54) COMPACT BINARY EVENT LOG GENERATION

(71) Applicant: OptumSoft, Inc., Menlo Park, CA (US)

(72) Inventor: David R. Cheriton, Palo Alto, CA (US)

(73) Assignee: OptumSoft, Inc., Menlo Park, CA (US)

( * ) Notice: Subject to any disclaimer, the term of this patent is extended or adjusted under 35 U.S.C. 154(b) by 73 days.

(21) Appl. No.: 15/174,821

(22) Filed: Jun. 6, 2016

(65) Prior Publication Data

US 2017/0024272 A1 Jan. 26, 2017

Related U.S. Application Data

(60) Provisional application No. 62/195,426, filed on Jul. 22, 2015.

(51) Int. Cl.
*G06F 11/00* (2006.01)
*G06F 11/07* (2006.01)
*G06F 11/34* (2006.01)

(52) U.S. Cl.
CPC ...... *G06F 11/0706* (2013.01); *G06F 11/0775* (2013.01); *G06F 11/34* (2013.01)

(58) Field of Classification Search
CPC .. G06F 11/0706; G06F 11/0775; G06F 11/34; G06F 11/0766; G06F 11/0769; G06F 11/0787; G06F 11/3065; G06F 11/3068; G06F 11/3082
See application file for complete search history.

(56) References Cited

U.S. PATENT DOCUMENTS

| | | |
|---|---|---|
| 5,991,760 A | 11/1999 | Gauvin et al. |
| 6,038,215 A | 3/2000 | Uekumasu |
| 6,477,605 B1 | 11/2002 | Taki et al. |
| 7,133,369 B1 | 11/2006 | Kennamer |
| 7,657,450 B2 | 2/2010 | Amit et al. |
| 8,099,737 B2 | 1/2012 | Rehman |
| 8,724,456 B1 | 5/2014 | Hong et al. |
| 8,825,848 B1* | 9/2014 | Dotan ................ H04L 63/1425 709/223 |
| 2002/0194495 A1 | 12/2002 | Gladstone et al. |
| 2003/0041046 A1* | 2/2003 | Allison ............... G06F 11/0709 |
| 2004/0143823 A1 | 7/2004 | Wei |
| 2004/0215792 A1 | 10/2004 | Koning et al. |
| 2005/0086376 A1 | 4/2005 | Park et al. |
| 2005/0237567 A1 | 10/2005 | Morris |
| 2007/0055553 A1 | 3/2007 | Kwan |
| 2007/0133394 A1* | 6/2007 | Walton ................ H04L 12/5601 370/216 |
| 2007/0220481 A1 | 9/2007 | Gabel et al. |
| 2007/0276885 A1 | 11/2007 | Valiyaparambil et al. |
| 2008/0040628 A1 | 2/2008 | Mandal |
| 2012/0303641 A1* | 11/2012 | Gudlavenkatasiva ....................... G06F 11/0709 707/755 |

(Continued)

*Primary Examiner* — Joseph D Manoskey
(74) *Attorney, Agent, or Firm* — Van Pelt, Yi & James LLP

(57) ABSTRACT

Logging includes: obtaining an event designating message (EDM) comprising: a set of keys, or a type of designation corresponding to the set of keys, or both; looking up a set of values associated with the set of keys in a key-value store storing a plurality of keys and their corresponding values; constructing an event using the set of keys and values corresponding to the set of keys; and outputting the constructed event.

19 Claims, 13 Drawing Sheets

(56) References Cited

U.S. PATENT DOCUMENTS

| | | |
|---|---|---|
| 2014/0051485 A1 | 2/2014 | Wang et al. |
| 2014/0101497 A1* | 4/2014 | Kishimoto ............ H04L 43/045 |
| | | 714/54 |
| 2014/0108642 A1 | 4/2014 | Cheriton et al. |

* cited by examiner

| | 304 | | | 314 | |
|---|---|---|---|---|---|
| Key 1 | Value A | | Key 1 | Value A |
| Key 2 | Value B | | Key 2 | Value B |
| ... | | | ... | |
| Key n | Value N | | Key n | Value N |

FIG. 3B

COMPACT BINARY EVENT LOG GENERATION

CROSS REFERENCE TO OTHER APPLICATIONS

This application claims priority to U.S. Provisional Patent Application No. 62/195,426 entitled COMPACT BINARY EVENT LOG GENERATION filed Jul. 22, 2015 which is incorporated herein by reference for all purposes.

BACKGROUND OF THE INVENTION

Logging is an important tool to detect and analyze performance, security, and event correctness/consistency problems. Logging is beneficial because the application performing the process is not burdened with the resource demands of performing the analysis. Logging also allows independent and various software components to be used for post analysis without incorporating detailed knowledge of, and dependency on, the application system software.

For logging information to be useful for analysis, the application system typically needs to log events at reasonably fine granularity. To extract information from the resulting logs, the event information needs to be structured or semi-structured and reasonably complete so that the post processing software can extract information from the logs. Information within each process is normally represented in a binary format. Log information is generally stored in a string format to provide a complete description of an event. Converting information from a binary format to a textual format for logging purposes can incur significant overhead. Such requirements impose high overhead on the application system and can degrade application performance. What is needed is a space and time efficient representation of event logs that allows one to achieve frequent logging that can reconstruct complete information on system actions while incurring minimal overhead.

BRIEF DESCRIPTION OF THE DRAWINGS

Various embodiments of the invention are disclosed in the following detailed description and the accompanying drawings.

FIG. 3B depicts key-value stores of the application processor and a log processor.

DETAILED DESCRIPTION

Figure 1:
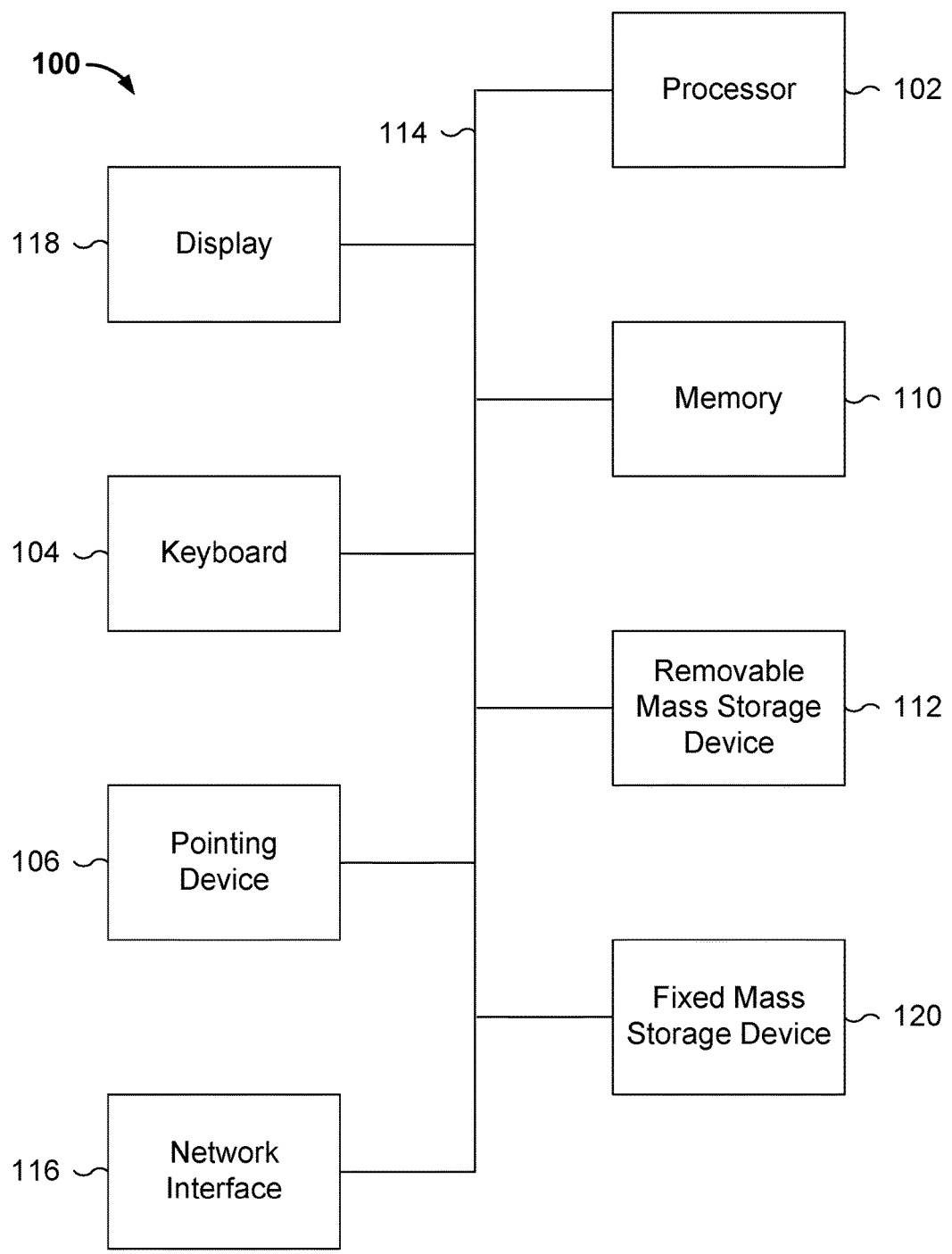
FIG. 1 discloses a system diagram.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An efficient event logging technique that reduces logging overhead is disclosed. An event is application specific and describes a meaningful activity that occurs within the application. For example, for a server storing documents where some of the documents may be top secret, an event may occur when a person attempts to download a top secret document from the server. In some embodiments, the logging technique employs a key-value protocol (KVP) to log events. The KVP is structured as a sequence of key-value assignment messages (KVAMs), where each KVAM includes a key and a value. As an application is running on an application processor, values are updated and events occur. The application processor maintains a key-value store (KVS) to reflect the state of the application. Each time a value in the application is updated, the application processor updates its own KVS to reflect the change and sends a KVAM to be stored in an event log. A log processor is able to access the KVAM from the event log and update its own key-value store. The log processor maintains its own KVS to reflect the state of the application running on the application processor. When an event occurs, the application processor sends an event designating message (EDM) to the event log. The EDM specifies the keys required to reconstruct a complete description of the event. Post-processing software running on the log processor is able to access the EDM from the event log, look up the keys from the KVS of the log processor, and reconstruct a complete description of the event. By doing so, the log processor is able to construct a complete description of the event while minimizing the amount of overhead required by the application processor to create a full description of the event.

FIG. 1 is a functional diagram illustrating a programmed computer system for event logging in accordance with some embodiments. As shown, FIG. 1 provides a functional diagram of a general purpose computer system programmed for event logging in accordance with some embodiments. As will be apparent, other computer system architectures and configurations can be used to execute event logging. Computer system 100, which includes various subsystems as described below, includes at least one microprocessor subsystem, also referred to as a processor or a central processing unit ("CPU") 102. For example, processor 102 can be implemented by a single-chip processor or by multiple cores and/or processors. In some embodiments, processor 102 is a general purpose digital processor that controls the operation of the computer system 100. Using instructions retrieved from memory 110, the processor 102 controls the reception and manipulation of input data, and the output and display of data on output devices, for example display 118.

Processor 102 is coupled bi-directionally with memory 110, which can include a first primary storage, typically a random access memory ("RAM"), and a second primary storage area, typically a read-only memory ("ROM"). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as is well known in the art, primary storage typically includes basic operating instructions, program code, data, and objects used by the processor 102 to perform its functions, for example programmed instructions. For example, primary storage devices 110 can include any suitable computer-readable storage media, described below, depending on whether, for example, data access needs to be bi-directional or uni-directional. For example, processor 102 can also directly and very rapidly retrieve and store frequently needed data in a cache memory, not shown.

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storages 112, 120 generally store additional programming instructions, data, and the like that typically are not in active use by the processor 102. It will be appreciated that the information retained within mass storages 112, 120 can be incorporated, if needed, in standard fashion as part of primary storage 110, for example RAM, as virtual memory.

In addition to providing processor 102 access to storage subsystems, bus 114 can be used to provide access to other subsystems and devices as well. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information, for example data objects or program instructions, from another network, or output information to another network in the course of performing method/process steps. Information, often represented as a sequence of instructions to be executed on a processor, can be received from and outputted to another network. An interface card or similar device and appropriate software implemented by, for example executed/performed on, processor 102 can be used to connect the computer system 100 to an external network and transfer data according to standard protocols. For example, various process embodiments disclosed herein can be executed on processor 102, or can be performed across a network such as the Internet, intranet networks, or local area networks in conjunction with a remote processor that shares a portion of the processing. Throughout this specification, "network" refers to any interconnection between computer components including the Internet, Ethernet, intranet, local-area network ("LAN"), home-area network ("HAN"), serial connection, parallel connection, wide-area network ("WAN"), Fibre Channel, PCI/PCI-X, AGP, VLbus, PCI Express, Expresscard, Infiniband, ACCESS.bus, Wireless LAN, WiFi, HomePNA, Optical Fibre, G.hn, infrared network, satellite network, microwave network, cellular network, virtual private network ("VPN"), Universal Serial Bus ("USB"), FireWire, Serial ATA, 1-Wire, UNI/O, or any form of connecting homogenous, heterogeneous systems and/or groups of systems together. Additional mass storage devices, not shown, can also be connected to processor 102 through network interface 116.

An auxiliary I/O device interface, not shown, can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits ("ASIC"s), programmable logic devices ("PLD"s), and ROM and RAM devices. Examples of program code include both machine code, as produced, for example, by a compiler, or files containing higher level code, for example, a script that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
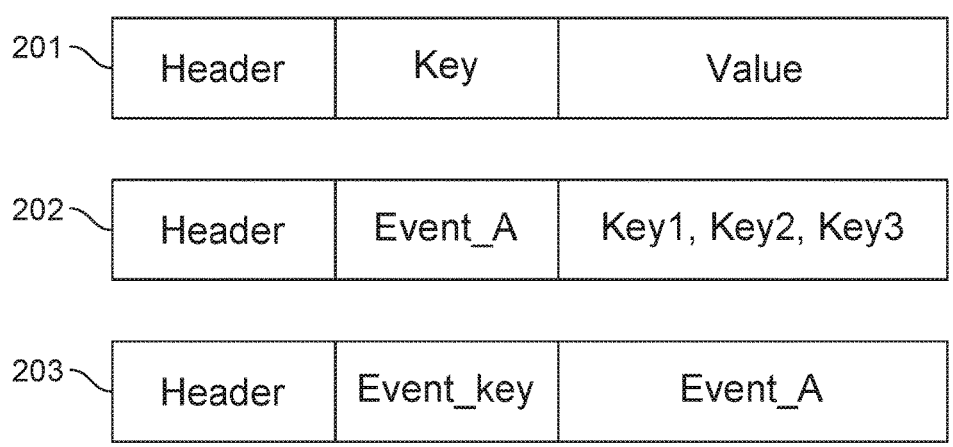
FIG. 2 represents examples of key-value assignment messages.

FIG. 2 depicts examples of key-value assignment messages (KVAMs) that may be used in a key-value protocol (KVP). In the example shown, a KVAM such as 201 is a basic building block that allows types, attributes, representations, etc. to be defined in the KVP. KVAM 201 is comprised of a header, a key, and a value. The header includes a length field and control bits that indicate how to interpret the key portion of the KVAM. The key portion of the KVAM indicates a property of interest and the value portion of the KVAM indicates a value for the property. For example, a key-value pair "user"="jsmith" can be used in the description of an event to indicate that a value (e.g., identifier) of "jsmith" was associated with the key of "user." Other KVAM fields and formats can be used in other embodiments.

An event designating message (EDM) is a specific type of KVAM. In the example shown, a KVAM such as 202 is an EDM and includes the key-value pair of "Event_A"="Key 1, Key 2, Key 3". Key 1, Key 2, and Key 3 are used to denote the actual keys being used, such as "user", "severity", "errorCode", etc. The EDM specifies a list of keys that identify the state describing the event. The key portion of the EDM is a specific value that is used to indicate to post-processing software that the KVAM is an EDM. The values in the EDM specify one or more keys that are used to create a full description of the event. In the example shown, "Key 1," "Key 2," and "Key 3" are used by post-processing software to create a description of "Event_A". This reduces the amount of overhead required to create a description of "Event_A" because instead of sending the entire description of the event each time an event occurs, later EDMs can reference values that were previously sent and stored in a KVS of a log processor. An EDM may also contain an indication of the time of the event.

The KVP further reduces overhead in the logging of events because the keys required to create a description of an event may be indirectly referenced through the use of an event definition. The EDM may be defined such that it specifies a key associated with a list of keys instead of repeating the actual list of keys associated with the event each time. In this case, the log processor looks up the key in its KVS to retrieve the value that stores the list of actual keys for the event, and then proceeds to look up the values associated with these actual keys to get the actual values associated with the event. This further reduces the amount of overhead because instead of sending KVAM 202 with key-value pair of "Event_A"="Key 1, Key 2, Key 3" the application processor is able to send KVAM 203 with a key-value pair of "Event_key"="Event_A". When creating a description of the event, post-processing software determines that "Event_key" references "Event_A", which it determines from a previous message that "Event_A"="Key 1, Key 2, Key 3". KVAM 202 and KVAM 203 cause post-processing to create the same description of the event. Both reduce the amount of overhead required to create a description of "Event_A" because both instances of the EDM do not require a full description of the event in the message. KVAM 203 also reduces the amount of information transmitted if a given event occurs more than once.

Type-Based Interpretation of KVP Messages

In some embodiments, a key-value pair listing one or more keys is regarded as a type definition. The KVP allows other key-value pairs to construct additional KVPs based on predefined or user-defined definitions. For example, the "Event_key" may be a considered a "baseEvent". Then a subsequent type-defining key-value pair can reference this "baseEvent" as its base type, thereby effectively including each of the keys in this "baseEvent" into its definition. In the example provided, "Event_key2 " may be defined as "Event_key, Key 4, Key 5". When encountered by post-processing software, the post processing software determines that a full description of "Event_key2" includes the values associated with "Key 1", "Key 2", "Key 3", "Key 4", and "Key 5".

In an embodiment, the keys in the KVS can be associated with different types. For example, an application can use the type Account ID, which is represented as a (binary) 32-bit integer. The KVP can support transmitting in the event log an Account ID in this binary form to avoid the overhead of conversion to some other form when generating an event that needs to specify an account ID. Compared to a conventional key-value textual representation of an event log, there is no need to convert from computer internal binary representation to a text format because the event values are written in the same binary representation as they are used in the program, which saves on overhead. This binary representation is generally more compact than a text format, reducing the number of bytes that need to be written. Some other keys may use a floating point representation or a string representation. In some embodiments, a key corresponds to an enumeration with named values. For example, the enumeration may correspond to colors, defining 0 as black, 1 as red, 2 as blue, and 3 as yellow. Transmitting the full type-descriptive information for an attribute on every usage would incur significant overhead.

A key may reference other keys. Such a key is considered to be a type and the referenced keys are considered to be attributes of the type. The term attribute is used to refer to a key that has additional associated metadata, such as its type, its representation, etc. A reserved KVAM (or a set of messages) is provided that allows an attribute to be defined corresponding to an attributeId key that can occur in a KVAM. In an embodiment, such a message specifies the attributeId, the attribute name, the index and value types, and possibly other information about the attribute. In an embodiment, the index and value types are specified by typeIds which reference previously defined types or well-known/base types used by the system 300. For example, typeIds for integers, flags, floating point numbers, strings, etc. can be predefined. In an embodiment, a reserved KVP message (or set of messages) is provided that allows a type to be defined in terms of a list of attributes. For example, a key-value pair of a Position type can be defined as containing the x, y, and z attributes, i.e., "Position"="x, y, z", each of type floating point, allowing a geometric application to report an event that includes positions. In an embodiment, a reserved KVP message (or set of messages) is provided that allows an objectId to be defined in terms of a typeId, i.e., to be of the specified type.

By appending the type and attribute definition information to a log prior to implementing the key-value protocol of the associated attributeIds and typeIds, an event log processing application can construct and interpret the KVS, thus allowing the event log processing application to process events in the log without having full a priori knowledge of all application types. As a result, the event log processing application is not required to convert internal values to a restricted fixed set of types supported by the event log post processing applications, such as strings.

With this type and attribute support, using the KVP, the application processor can transmit values in binary form using one of the base representation types, such as Boolean, byte, half-word, word, double word, floating point, etc. and the receiver, i.e., a log processor, is able to interpret the compact binary representation correctly. The type and attribute definitional capabilities are referred to as introspection support.

Using the KVP, post processing software reads the type and attribute definitions, and then reads the sequence of messages to recreate the state of the attributes.

Figure 3A:
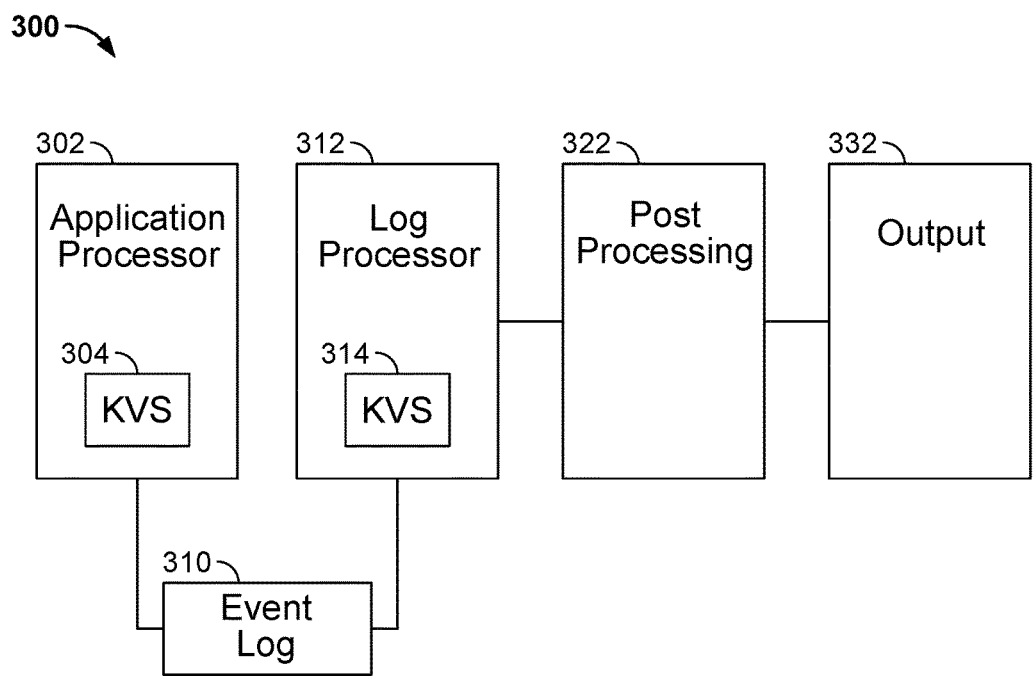
FIG. 3A depicts an event logging system.

FIG. 3A is a diagram showing an embodiment of a system that implements the KVP and communicates using KVAMs. In the example shown, the event logging system 300 includes an application processor 302, an event log 310, a log processor 312, post processing software 322, and output 332. Application processor 302 includes KVS 304. KVS 304 maintains a state of the application running on application processor 302. Using the KVP, application processor 302 can cause log processor 312 to update KVS 314 to replicate the state of KVS 304, assuming that there is a consistent initial state between KVS 304 and KVS 314. When a value of the application is updated, application processor 302 updates the value of a corresponding key in KVS 314. Application processor 302 sends a KVAM to event log 310 to reflect the update. Event log 310 is a database or memory that stores the KVAMs sent from application processor 302. Log processor 312 includes its own KVS 314. Log processor 312 receives the KVAM stored in event log 310 and updates KVS 314.

Event log 310 receives KVAMs from application processor 302. The KVAMs in event log 310 since the previous EDM are associated with a current EDM. In the event an EDM references a key-value pair that has not been updated since the last EDM, then a description of the event is recreated using the value stored in KVS 314 associated with that key-value pair. In another embodiment, the current EDM is associated with one or more key-value assignment messages that occur after the current EDM and before a subsequent EDM.

Post processing software 322 may reside in log processor 312 or reside on a different computer that is connected and has access to log processor 312. Post processing software 322 accesses EDMs stored in event log 310. Post processing software 322 analyzes the EDM to determine the associated keys necessary to create a full description of the event. The components described above can be implemented as software components executing on one or more processors, as hardware components such as programmable logic devices (e.g., microprocessors, field-programmable gate arrays (FPGAs), digital signal processors (DSPs), etc.), Application Specific Integrated Circuits (ASICs) designed to perform certain functions, or a combination thereof. In some embodiments, the components can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present application. The components may be implemented on a single device or distributed across multiple devices. The functions of the components may be merged into one another or further split into multiple sub-components.

A full description of the event is provided from post-processing software 322 to output 332. Output 332 may be a file storing the events, a database storing the events, a monitor or screen displaying the events, etc. In some embodiments, the events are outputted to a computational module (e.g., a log event reconstruction module) that processes the generated event record.

Figure 3B:
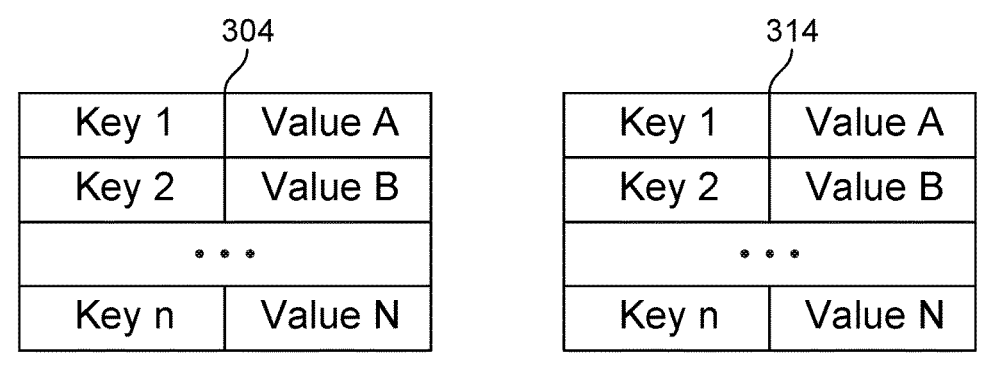

FIG. 3B depicts an embodiment of a KVS of an application processor and an embodiment of a KVS of a log processor. The example specifically illustrates KVS 304 of application processor 302 and KVS 314 of log processor 312. In the example shown, the states of KVS 314 and KVS 304 are the same. Recreating KVS 304 of application processor 302 to KVS 314 of log processor 312 means that application processor 302 is not burdened with the resource demands of performing the post-logging analysis. Post processing software 322 may generate a complete description of the event without using resources of application processor 302.

Figure 4A:
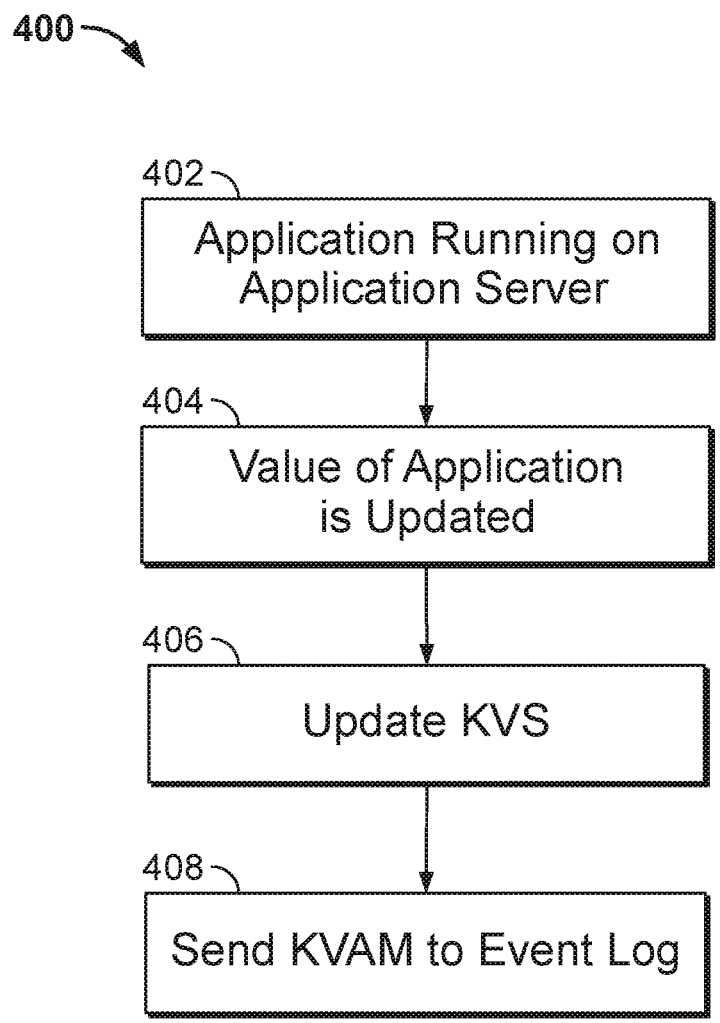
FIG. 4A is a flowchart depicting the process of sending a key-value assignment message.

FIG. 4A is a flowchart depicting an embodiment of a process for sending a KVAM to an event log. Process 400 can be performed by application processor 302 to send a KVAM to event log 310.

In 402, an application is running (executing) on application processor 302. For example, non-limiting examples of the application include a network processing application, a banking software application, a purchase order application, or any other application where it is useful to log events.

In 404, a value of the application has changed and/or been updated. The value may be any variable of the application that is subject to change. For example, a user of the application may have changed or a severity level associated with an event may have changed. In a non-limiting example, suppose that the value for "Key 1" has changed from "X" to "Y".

In 406, application processor 302 updates the key-value pair in KVS 304 to reflect the update. For example, if a key-value pair was previously "Key 1"="X", but now X has become Y, the key-value pair in KVS 304 is updated to be "Key 1"="Y".

In 408, application processor 302 sends a KVAM to event log 310 to reflect the change in value. In some embodiments, the KVAM has a configuration similar to the configuration of KVAM 201. In the above non-limiting example, the KVAM includes a header portion, "Key 1" in the key portion to indicate the key that is being updated, and "Y" in the value portion to indicate that "key 1" now has a value of "Y".

Figure 4B:
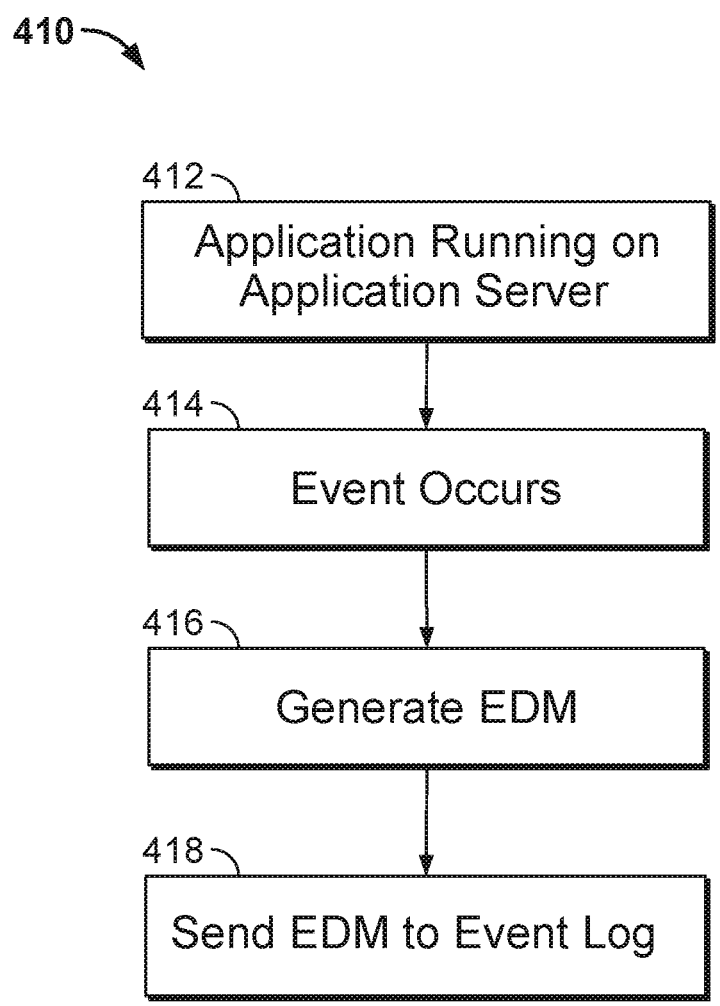
FIG. 4B is a flowchart depicting the process of sending an event designating message.

FIG. 4B is a flowchart depicting an embodiment of a process for sending an EDM to an event log. Process 410 can be performed by application processor 302 to send an EDM to event log 310. In 412, an application is running on application processor 302.

In 414, an event has occurred within the application. An event is application specific and describes a meaningful activity that occurred within the application. Non-limiting examples of an event include when a user has tried to access a top-secret document, when a user attempts to complete a purchase transaction, or when a user withdraws money from a bank account.

In 416, application processor 302 generates an EDM to log the event. Generating the EDM includes identifying the keys associated with the event. The definition of the EDM is stored in KVS 304. Application processor 302 accesses KVS 304 and identifies the keys associated with the event. In some embodiments, application processor 302 configures the EDM to have a structure similar to KVAM 202. In other embodiments, application processor 302 configures the EDM to have a structure similar to KVAM 203.

In 418, application processor 302 sends the EDM to event log 310. In some embodiments, the EDM includes a timestamp as part of the value portion of the EDM. When the post-processing software 322 creates a description of the event from the EDM, it is able to associate the event with a particular moment in time.

Figure 4C:
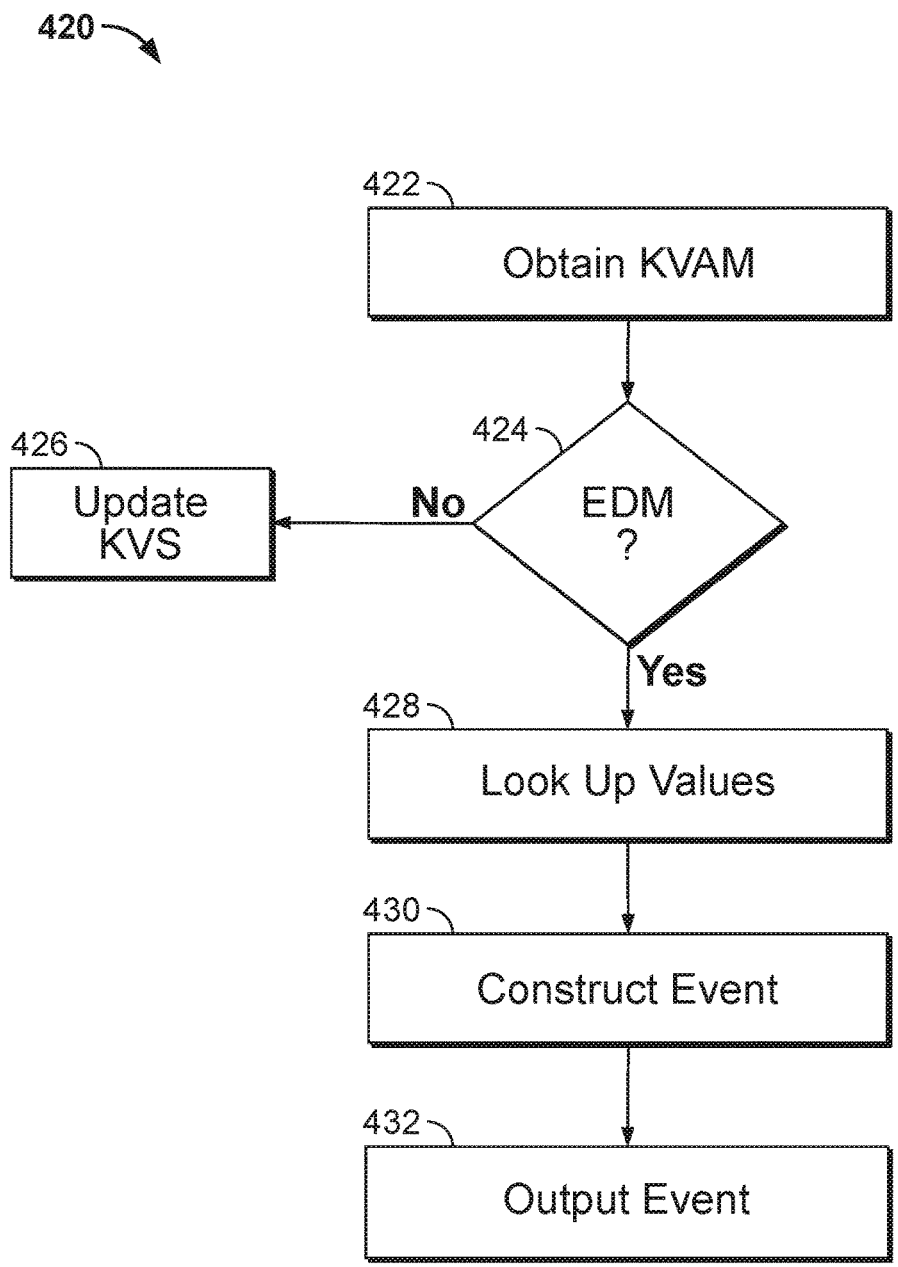
FIG. 4C is a flowchart depicting the process of obtaining key-value assignment messages from an event log.

FIG. 4C is a flowchart depicting an embodiment of a process for creating a description of an event. Process 420 can be performed by log processor 312 accessing event log 310 and executing post processing software 322.

In 422, log processor 312 obtains a KVAM from event log 310. Log processor 312 may obtain the KVAM as soon as it is stored in event log 310 or it may obtain the KVAM at a later scheduled time. For example, log processor 312 may obtain the KVAM from event log 310 a second, a minute, an hour, a day, a week, or months after it was stored in event log 310.

In 424, post processing software 322 determines whether the KVAM is an EDM. Post processing software 322 accesses KVS 314 and compares the key field of the KVAM with a list of known EDM key values. Certain keys, such as "Event_A", "baseEvent", "Event_key", or "Event_key2", are designated as keys of EDMs. Keys that are designed as event designating keys are provided to log processor 312 at runtime. In some embodiments, events are created at any time and event definitions that include the event designating keys are stored in KVS 314.

In the event that post processing software 322 determines that the KVAM includes one of the designated keys, post processing software 322 is configured to handle the KVAM as an EDM. If the KVAM does not include the event designating key, then the KVAM is handled as a regular KVAM and in 426, log processor 312 updates the state of KVS 314.

If the KVAM includes the event designating key, then at 428, post processing software 322 looks up the keys associated with the event from KVS 314. Post processing software 322 is a program executed by log processor 312 or a program executing on a different computer that is connected and has access to log processor 312.

In 430, post processing software 322 constructs the event using the keys specified directly or indirectly by the EDM. In 432, the event description is outputted to a file or database, displayed to an operator, or to any other appropriate destination.

Figures 5A, 5B:
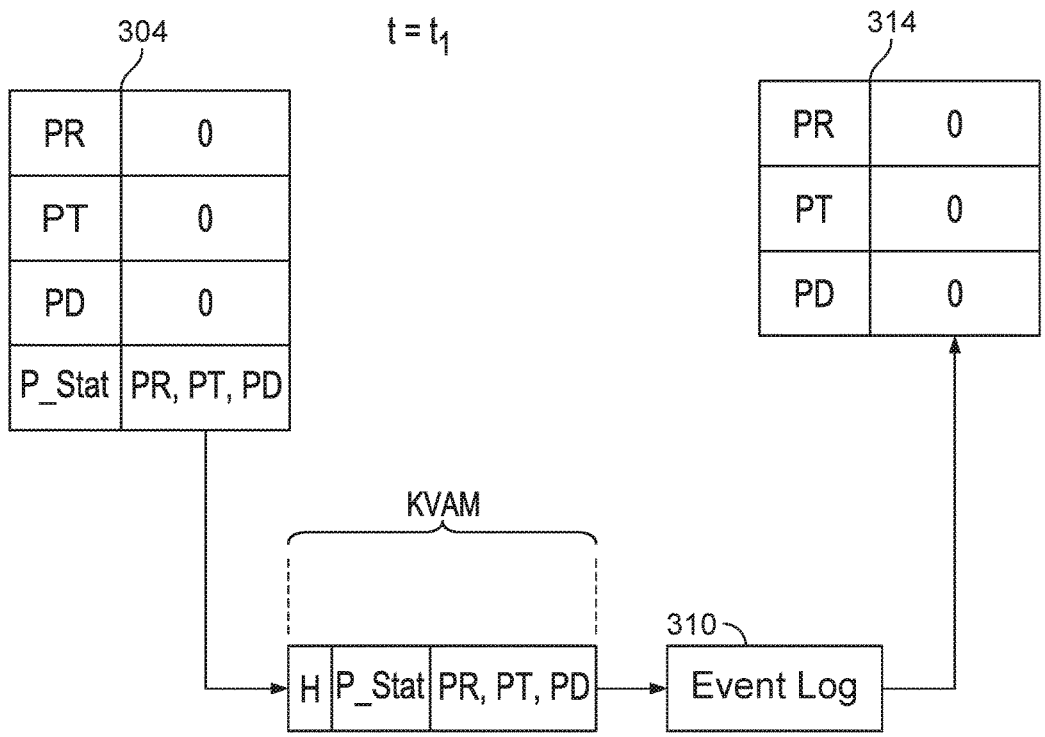
FIGS. 5A-H depict a process of event logging.

FIGS. 5A-5H illustrate an example of updating a key-value store using the KVP. The illustrated steps can be performed using the system 300 depicted in FIG. 3A. In FIG. 5A at t=$t_0$ (runtime), the event type definitions and attribute definitions are sent from application processor 302 to log processor 312. These definitions allow post processing software 322 to properly interpret KVAMs and create a full description of events. In the example shown, the definition for a P_Stat event is to be sent from application processor 302 to log processor 312. A "P_Stat" event causes application processor 302 to report packet statistics. For example, the packet statistics may be reported on a periodic basis, such as every ten minutes, every hour, daily, weekly, monthly, etc. The packet statistics may also be reported on a non-periodic basis, such as upon command from a user or upon request from another system. The definition for a "P_Stat" event is stored in KVS 304. The definition for the P_Stat event includes the keys "PR", "PT", and "PD". "PR" is an abbreviation for "Packets Received", "PT" is an abbreviation for "Packets Transmitted", and "PD" is an abbreviation for "Packets Dropped". At this point, KVS 314 has not stored the definition for P_Stat because log processor 312 has not obtained a KVAM from event log 310 indicating that log processor 312 should update its KVS 314.

In FIG. 5B at a later time t=$t_1$, sometime after $t_0$, application processor 302 determines that the definition for P_Stat is to be transmitted to event log 310 using a KVAM. The key-value pair of the KVAM is "P_Stat"="PR, PT, PD". Event log 310 stores the KVAM and log processor 312 accesses the KVAM from event log 310. Log processor 312 may obtain the KVAM at any time after event log 310 stores the KVAM.

Figure 5C:
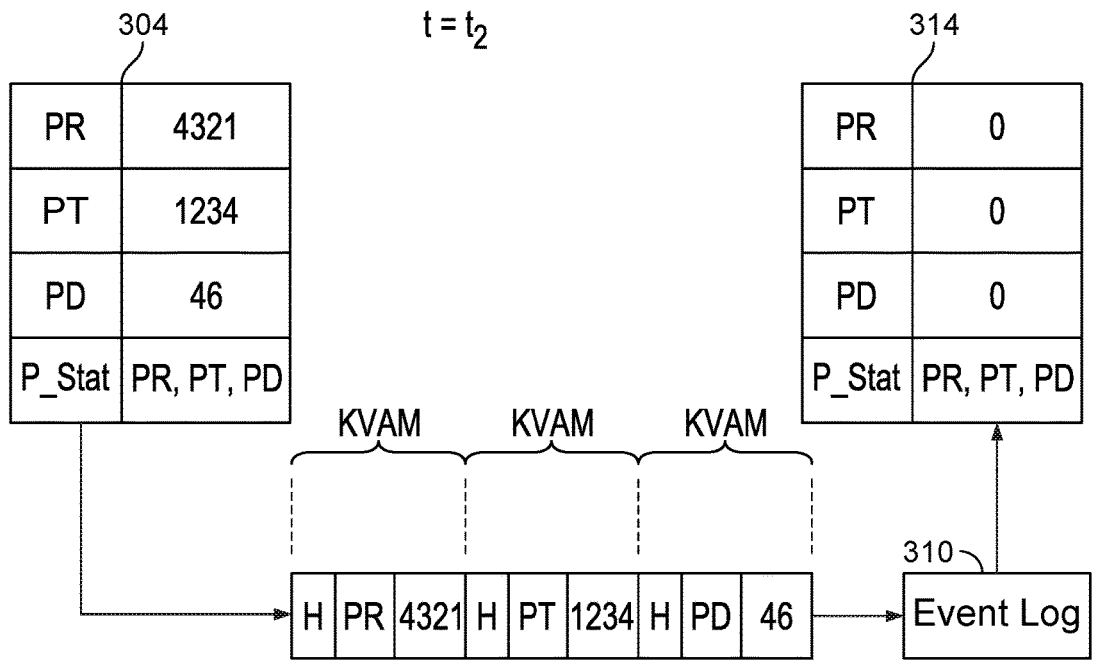

In FIG. 5C at a later time t=$t_2$, log processor 312 obtains the "P_Stat" definition from event log 310 and updates KVS 314. Log processor 312 may receive an indication from event log 310 that a KVAM is stored in event log 310. Alternatively, log processor 312 may retrieve KVAMs from event log 310 based on a predefined schedule. Meanwhile, a process executing on application processor 302 causes application processor 302 to update KVS 304. The values of PR, PT, and PD have been updated to be 4321, 1234, and 46, respectively. Application processor 302 sends a series of KVAMs comprising the changed key-value pairs to event log 310 to reflect the updates.

Figure 5D:
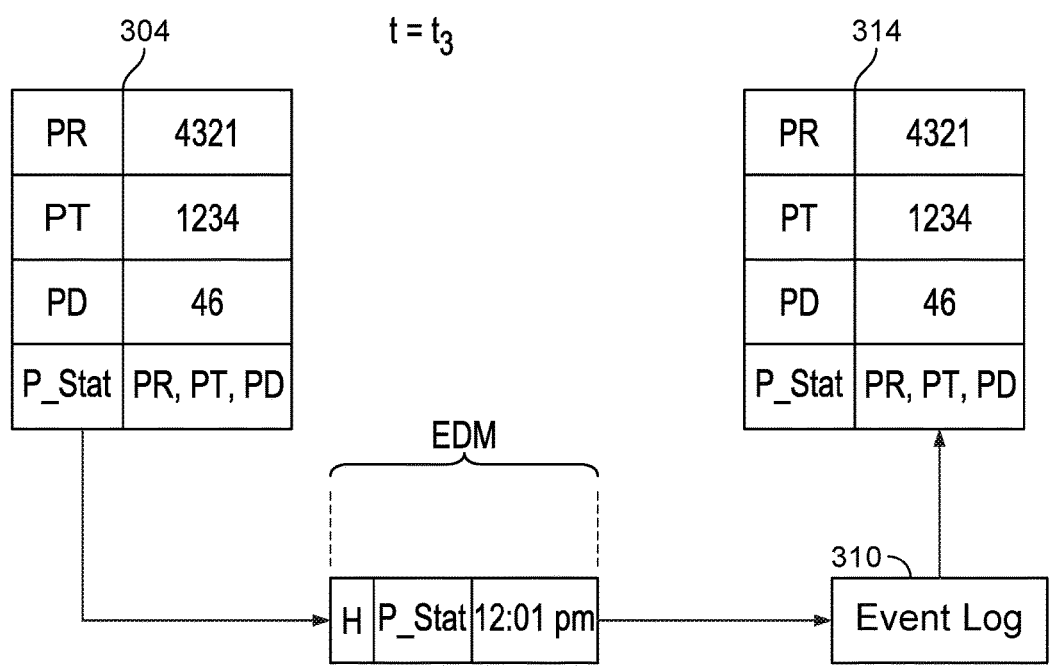

In FIG. 5D at a later time t=$t_3$, log processor 312 accesses the KVAMs from event log 310 and updates KVS 314. Log processor 312 may receive an indication from event log 310 that a KVAM is stored in event log 310. Alternatively, log processor 312 may retrieve KVAMs from event log 310 based on a predefined schedule. Meanwhile, at t=$t_3$, a "P_Stat" event occurs at application processor 302. The "P_Stat" event causes application processor 302 to send an EDM to event log 310.

Figure 5E:
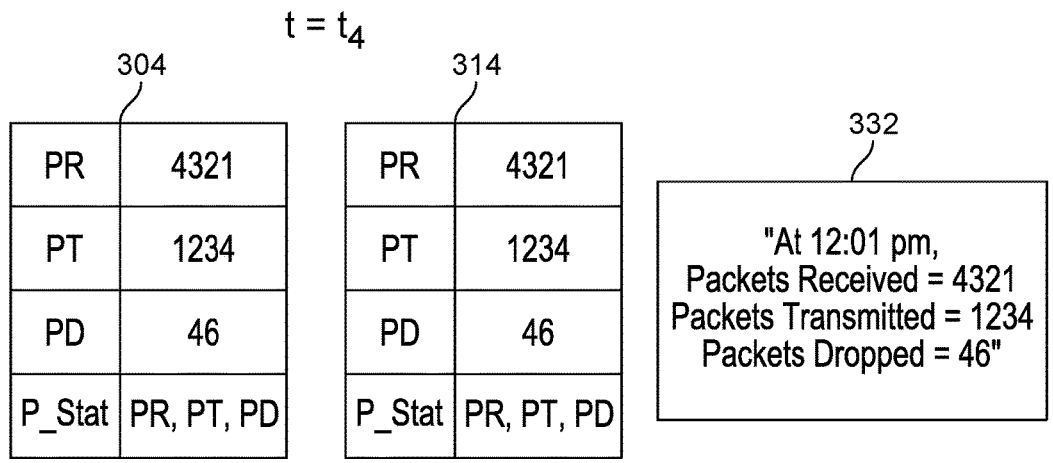

In FIG. 5E at a later time t=$t_4$, log processor 312 obtains the EDM from event log 310 and post processing software 322 analyzes the key of the EDM and determines that a key "P_Stat" indicates that this particular KVAM is an EDM. Log processor 312 may receive an indication from event log 310 that an EDM is stored in event log 310. Alternatively, log processor 312 may retrieve the EDM from event log 310 based on a schedule. Post processing software 322 determines that this particular KVAM is an EDM because the P_Stat event definition was previously sent and stored in KVS 314. Upon encountering the P_Stat EDM, post processing software 322 is configured to retrieve the corresponding values associated with keys PR, PT, and PD from KVS 314. Output 332 outputs a description of the event as "At 12:01 pm, Packets Received=4321 Packets Transmitted=1234 Packets Dropped=46". If application processor 302 were to send the log event without using the KVP, it would use significant amounts of overhead. Using the KVP in this manner reduces the amount of overhead and resources used because the event description as a whole may be abbreviated through the use of KVAMs and EDMs without losing any description.

Figure 5F:
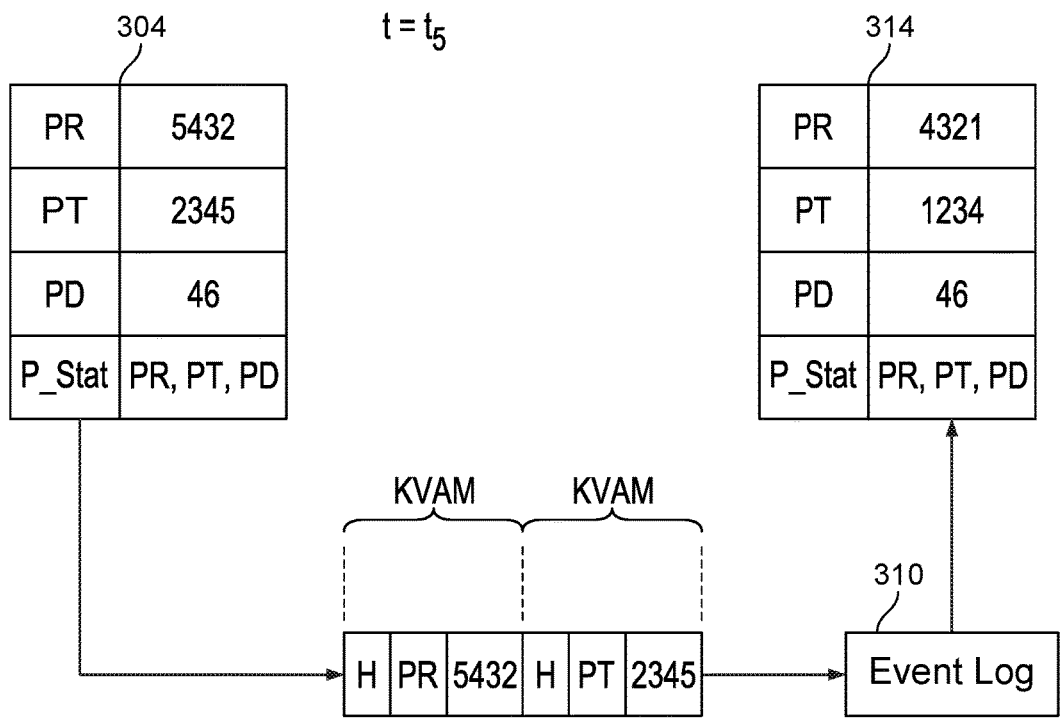

In FIG. 5F at a later time t=$t_5$, a process is executing on application processor 302 causing application processor 302 to update KVS 304. The process may output an indication that certain values of the process have been updated. The values of PR and PT have been updated to be 5432, 2345, respectively. Application processor 302 sends a series of KVAMs to event log 310 to reflect the updates. Log processor 312 obtains the series of KVAMs from event log 310. The KVAMs for PR and PT cause log processor 312 to update the corresponding values in KVS 314.

Figure 5G:
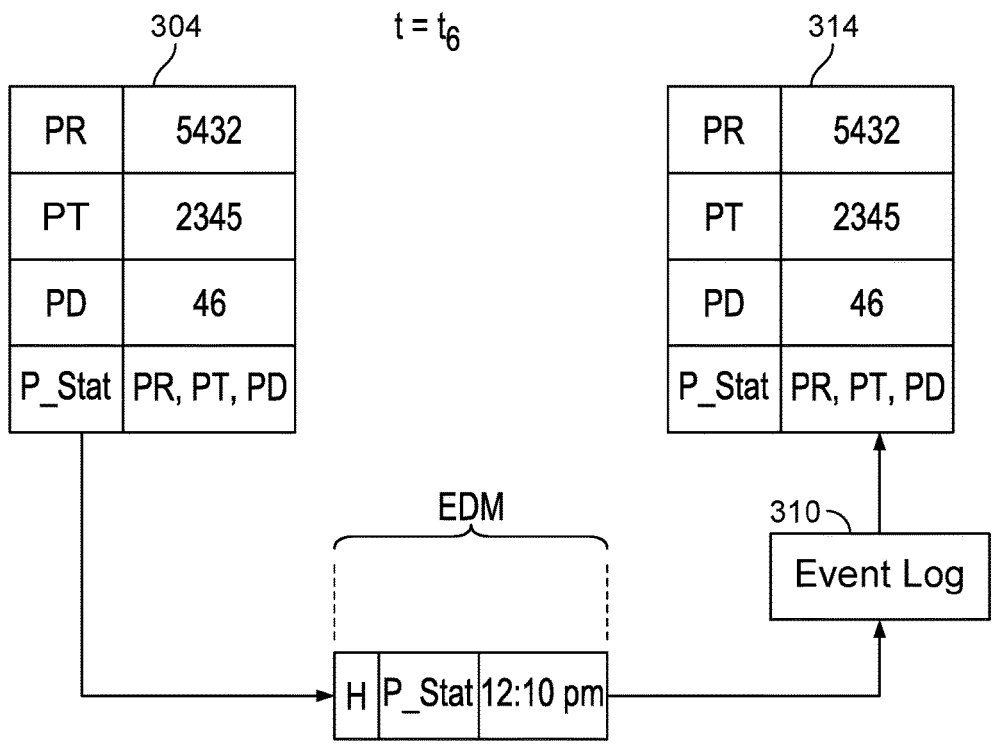

In FIG. 5G at a later time t=$t_6$, log processor 312 accesses the KVAMs in event log 310 and updates KVS 314. Log processor 312 may receive an indication from event log 310 that a KVAM is stored in event log 310. Alternatively, log processor 312 may retrieve KVAMs from event log 310 based on a schedule. Meanwhile, another "P_Stat" event occurs at application processor 302. The "P_Stat" event causes application processor 302 to send an EDM to event log 310. A redundant KVAM for PD is not sent because in this example the value for PD has not changed since the last "P_Stat" event. This also reduces the amount of overhead because a copy of the previous PD KVAM does not need to be sent from application processor 302 to log processor 312 because KVS 314 already stores the most current value for PD.

Figure 5H:
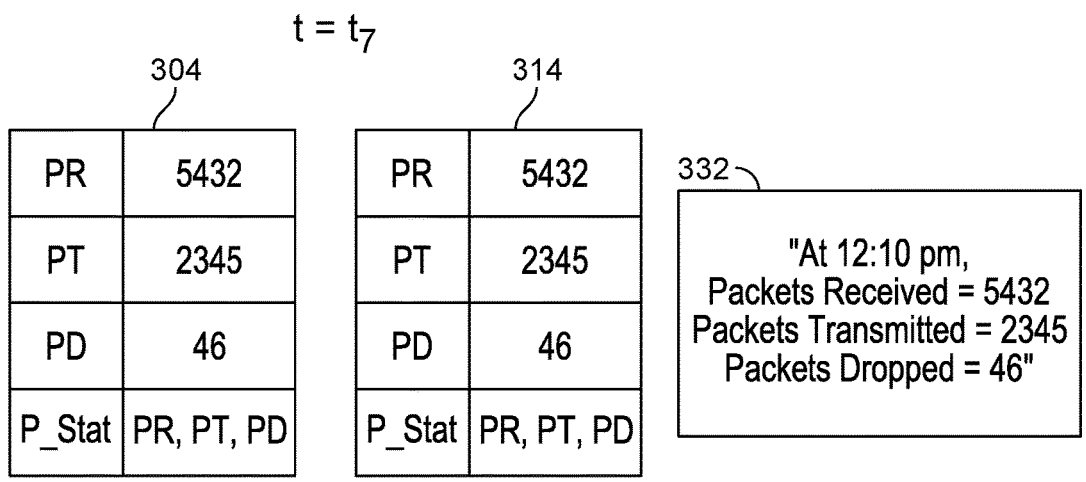

In FIG. 5H at a later time $t=t_7$, log processor 312 obtains the EDM from event log 310 and post processing software 322 analyzes the key of the EDM and determines that a key "P_Stat" indicates that this particular KVAM is an EDM. Post processing software 322 determines that this particular KVAM is an EDM because the P_Stat event definition was previously sent and stored in KVS 314. Upon encountering the P_Stat EDM, post processing software 322 is configured to retrieve the corresponding values for PR, PT, and PD. Even though the value for PD has not been updated since the last EDM, post processing software 322 is still able to create a description of the event because the value for PD was previously stored in KVS 314. Output 332 outputs a description of the event as "At 12:10 pm, Packets Received=5432 Packets Transmitted=2345 Packets Dropped=46".

In a large-scale complex application, the keys used with the KVP can end up being large in size to accommodate a variety of different categories of data. In some embodiments, the application state may be divided into multiple logical tables with the key structured as a table name followed by an identifier to identify the row within the table, followed by an identifier to the field within the row. Without this structure recognized in the KVP, the encoding of this structure in every key can cause significant overhead per message. Updating the keys requires using a structured key-value protocol (SKVP). In the above example, the key portion of the key-value pair may be "table_name.row.field". The SKVP allows the keys to be optimized. For example, if the current message applies to the same table as the previous message, the name of the table can be omitted by setting a specific bit in the header to a predefined value (e.g., 0 or 1) to indicate the omission. If the current message applies to the same table and row as the previous message, a bit in the header can be set to a predefined value to indicate that the table_name and row can be omitted and only the field designation is sent. The ability of the KVP to utilize the header in this manner reduces the amount of overhead in the event logging process because less information is sent with each update.

Object State

In some embodiments, overall state of the application is partitioned into different objects. The object may refer to a component associated with the application. The state within an object is further specified as a sequence of attributes. An attribute may be a collection attribute, in which case the object consists of a multiplicity of attribute entries, i.e., multiple key-value pairs, one for each value of the index for this attribute. Alternatively, the attribute may be a singleton attribute, in which case there is a fixed single attribute entry, i.e., a single key-value pair, and thus a single value, and no actual index.

Figure 6:
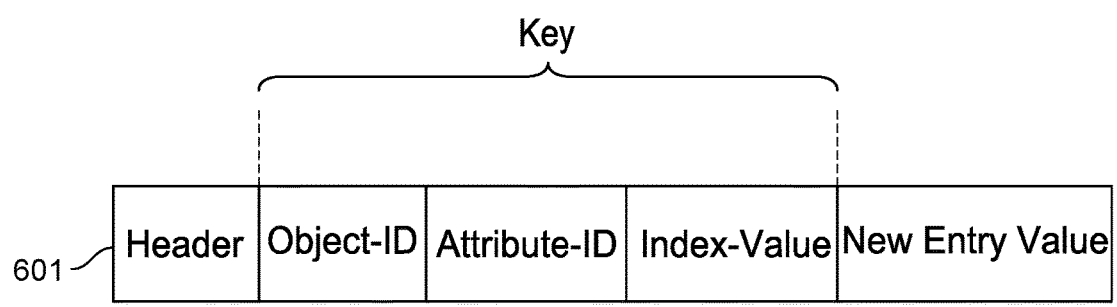
FIG. 6 depicts an example of a structured key-value assignment message.

An attribute entry is a key-value pair where the key is structured as "object-ID, attribute ID, and index value". FIG. 6 depicts an example of an attribute entry. The key portion of KVAM 601 includes an object-ID, an attribute-ID, and an index value. The key is structured to specify the object, the attribute, and the index for attribute entry within this attribute (if not a singleton attribute), and the value field is the new value for this attribute entry. In an embodiment, the object is identified by a binary ID, a numeric value that maps to the object state. Similarly, the attribute is identified by an ID. The index value and the attribute entry can be of type-specific to the application as defined in the declaration of the object. For example, an index value can be a character string value such as "Jsmith", identifying the object describing the associated user or principal in a collection of principals.

In another example, the object-ID may refer to a particular server, the attribute-ID may refer to a load average of that server, and the index value may refer to a set of values associated with the load average. In some embodiments, an index value of 0 corresponds to the load average over the last second, an index value of 1 corresponds to the load average over the last minute, and an index value of 2 corresponds to the load average over the last five minutes. The KVS may be updated using a SKVP message such as "server.load_avg.2"="100", indicating that the load average over the past five minutes for the server is "100".

In some embodiments, the SKVP can be optimized in various ways. For example, if the current message specifies the same objectId as a prior message, the objectId can be omitted, and some designation in the current message (such as a bit in the message header) can be set to indicate that the prior message's objectId should be used. If a series of consecutive messages refer to the same object and attribute, these updates can be combined into a single longer message that specifies the objectId and the attributeId once, followed by a sequence of (indexValue, newValue) pairs. Furthermore, individual values in an SKVP can be compressed using a compact binary encoding as used in the ISO ASN.1 BER or similar standards. In some embodiments, the object is identified by a binary ID, a numeric value that maps to the object state.

Recoverable Key-Value Protocol

In some embodiments, in a recoverable KVP (RKVP), application processor 302 is required to provide the current KVS state to log processor 312 on connection setup, even though this state was written before log processor 312 initiated said connection. This contrasts with a conventional transport protocol in which the only data received is that which is provided to the transport layer after the connection has been established.

The RKVP allows log processor 312 to resynchronize KVS 314 from application processor 302 after connection failure, allowing consistent recovery from connection failure, even if the recovery is to a separate source node, even in the presence of message loss during the period of switching over to the separate source. Moreover, the protocol ensures KVS 314 converges under quiescence to KVS 304. For example, application processor 302 sends the latest value stored in KVS 304 for each key. In some embodiments, the RKVP can drop certain updates on a connection to log processor 312 provided that the RKVP retains an indication of doing so, allowing the RKVP to later make KVS 314 consistent with KVS 304 by resending the dropped update(s) or the entire KVS. The RKVP can further retain an indication of dropped updates.

Figure 7A:
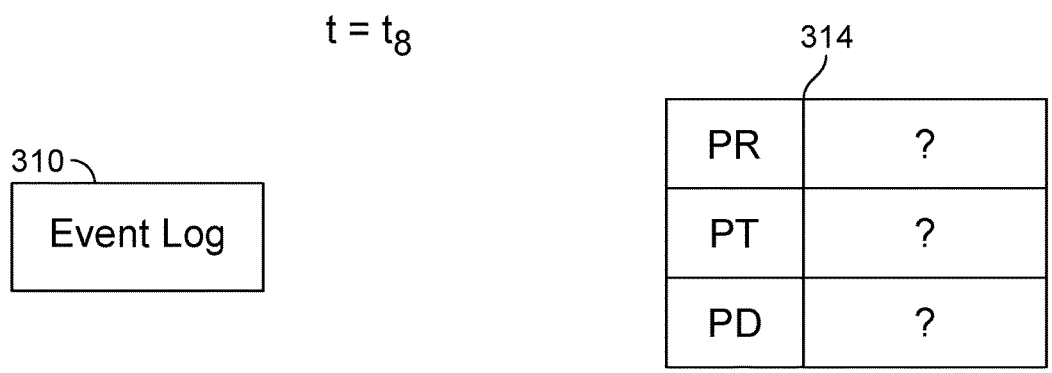
FIGS. 7A and 7B depict the process of using the event log as a recovery log.
Figure 7B:
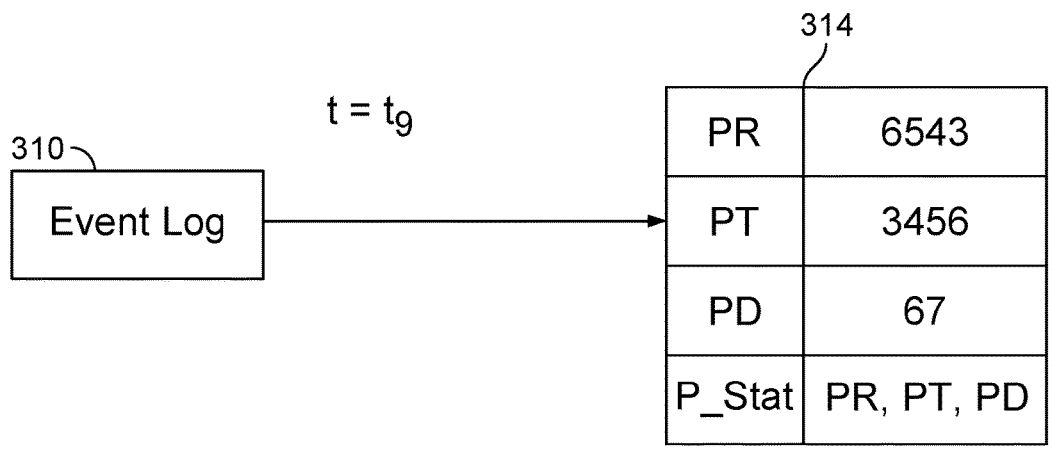

FIGS. 7A-B illustrate an example of using the event log as a recovery log. Event log 310 is used to recover the state of KVS 304 in the event of a crash or power failure. Log processor 312 rereads the event log to reconstitute the application state. For example, at a later time $t=t_8$, the connection between application processor 302 and log processor 312 has been lost. Application processor 302 continues to update its KVS 304 as the state of the application changes. Even though log processor 312 is offline, application processor 302 continues to send KVAMs to event log 310 whenever a value is updated. As a result, KVS 304 and KVS 314 are out of sync. Event log 310 allows KVS 304 and KVS 314 to be re-synced when the connection between application processor 302 and log processor 312 is reestablished. Specifically, at a later time t=$t_9$, log processor 312 comes back online, obtains the KVAMs from event log 310, and updates KVS 314. In some embodiments, event log 310 stores an indication that the entire KVS 304 needs to be retransmitted on reconnect. In some embodiments event log 310 stores a list of the keys to retransmit when log processor 312 comes back online. Upon reconnect, the values associated with the keys on the list are retrieved from KVS 304 to (re)generate the associated KVAMs and the associated key-value assignment message(s) are (re)transmitted to KVS 314.

Persistent Log as Event Log

In an embodiment, some portion (or all) of application state updates is written to one or more recovery log files using a KVP representation, allowing this state to be recovered in the case of crash or power failure, by rereading the file and reconstituting the application state from the log records. In such an embodiment, such a recovery log can also serve as an event log file, where each event is defined as the collection of messages (and thus their corresponding key-value pairs), delimited by a distinguished message, effectively serving as an EDM.

In an embodiment, an EDM in event log 310 is a transaction commit indication message. Transaction commit indication messages and transaction abort messages are used in the recovery log to determine whether to commit KVS updates to KVS 314. In addition to EDMs 202 and 203, application processor 302 sends transaction commit indication and abort messages to event log 310. A transaction commit indication message indicates that the updates to KVS 314 should be committed. In some embodiments, key-value pairs are updated and not committed until a transaction commit message is received. In such an embodiment, an event may be defined as the KVAM messages preceding this transaction commit indication message, starting after the previous transaction commit indication message. In a different embodiment, the event is defined as the current state of all the attributes within the scope of this EDM, independent of whether the state has been updated since the previous EDM. In an embodiment, the event log postprocessor is configured to apply one interpretation or another, depending on the requirements of the postprocessing. For example, in a banking context, the event applying to bank account BA at time Ti can be interpreted as either: a) the changes to BA as of time Ti, or; b) the state of BA at time Ti. The transaction commit indication message includes an indication of the time of the commit action. In an embodiment, the transaction commit message identifies the transaction and other processing information associated with the transaction, such as the user on whose behalf the transaction is being performed. Thus, the context of a state event can be determined from this transactional information, directly or indirectly.

The abort message indicates that the updates to the key-value pair since the previous transaction commit indication message should not be committed. For example, in some embodiments, key-value pairs are updated, but are followed by an abort message. In such an embodiment, the values after the last transaction commit indication message, but preceding the abort message, can be ignored and the key-value pairs would revert back to their previous values.

In an embodiment, the persistent file management periodically creates a checkpoint of application state, namely the state at a given time T, possibly the current time. The checkpoint file together with the persistent log records since the time of the checkpoint allow efficient implementation of an RKVP.

In an embodiment, a distinguished attribute is provided as an EDM that is independent of commit processing, typically specifying the time and possibly some indication of the selected state (in terms of attributes) constituting the event.

In an embodiment, introspection information describing the types, attributes, and objects represented in the persistent log is written, so the introspection information is available to an event postprocessing application. This introspection information allows event postprocessing 322 to interpret the persistent logs as event logs without a priori information about the application types (i.e., without being programmed with the knowledge of these types) of data being persisted in the log.

The ability to use the persistent log, storing the application state changes as an event log, reduces the I/O and processing cost incurred by the application compared to using a separate means for each. In particular, if an application uses a separate event log from the persistent log, it would have to generate and transmit an update to each of these separate logs. It also means that some on-going verification of proper persistent logging is provided in the case that the event log postprocessing is performed on an on-going basis while recovery from the persistent log is rarely exercised. Postprocessing software 322 should detect issues with the persistent logging as part of its postprocessing of the log, even if there is no fail-over occurring.

Besides these recoverable state updates, there are additional events that are outside the recoverable state, such as error conditions, establishing access to state, etc.

Processing Versus State Event Logging

In some embodiments, the KVAMs in event log 310 are used to analyze process events. Process events refer to various events of interest that occur during the processing of an application that are not reflected in the state of the application, particularly the persistent state. For example, changes to bank accounts are logged as events. A transaction abort is an important event that is not reflected in the changes to the persistent state unless there is an explicit provision to do so, such as an abort table, record or counter. A system administrator may be interested in how many times a person started to change a bank account, but aborted the process. This process would not be logged as an event since a change did not actually occur to the bank account, but a record of the abort process would be stored in event log 310. An abort message would be transmitted to event log 310 and any updates to the process since the last transaction commit indication message would be aborted. Analyzing the event log in this manner allows the behaviors of the application to be tracked. This is particularly useful for security audits in the event a person is trying to access a bank account and withdraw money, but money was not actually withdrawn. Application processing errors are similarly not normally represented.

In some embodiments, performance timing information such as when a transaction started and when the transaction is committed is also not normally part of the application persistent state. Yet, this information and other processing events are important for performance analysis and security audit.

This information is not normally part of, or sensible to make part of, persistent state for several reasons. First, performance timing information is often reported selectively depending on the configuration of the application. For example, in one embodiment the configuration only records error events whereas in another embodiment the configuration chooses to incur the overhead of recording the performance timing information. Second, coupling to persistent state means that the cost of recording is higher and is sometimes in conflict with persistent state constraints. For example, if persistent state is updated transactionally, performing a persistent state update to record the event that a transaction was aborted risks this particular recording also being aborted as well as incurring higher overhead than a non-transactional means.

In an embodiment, an application executed by application processor 302 explicitly generates processing events to a separate event log, separate from the persistent state event logs, such as event log 310. This approach avoids increasing the size of the persistent logs when these persistent logs are used for state event logging, as described earlier.

A Processing Event Log Interface Object

In an embodiment, the programming framework (common across multiple applications) defines one or more well-known event log interface objects that include the definition of attributes and types used by common processing events in the system. For example, such an interface object may define attributes such as user, processId, transactionId, file name, error code, etc. used across multiple event types. It may also define event types corresponding to common events that occur in the system.

For each modifiable attribute in an interface object, there is a mutator procedure that is used to update this attribute. Each mutator, when invoked, generates a KVP message that describes this attribute entry update. In an embodiment, this KVP message is written, directly or indirectly, to an event log file, such as event log 310. The well-known attributes and types can then be used in events without transmitting the corresponding attribute and type definitional messages. Also, an event postprocessing application, such as post processing software 322, can have a more efficient representation of these well-known types and attributes compared to a dynamically (at run-time) constructed representation based on type and attribute definitional messages in the event log.

In an embodiment, an event log interface object can include procedures to aid in the generation of common events, reducing the development effort required for an application to use event logging.

In an embodiment, one or more event log interface objects include the means to dynamically define object and attribute representations from the definitional messages read from event log 310. Then, it is simpler to develop multiple event log postprocessing applications without duplicating the mechanism. For example, one event log postprocessing application post processes the event logs in real-time, i.e., on-line, whereas another event log postprocessing application transforms the event logs off-line into the textual key-value pair representation expected by various so-called big data processing facilities.

In an embodiment, writing an attribute entry using a mutator to the same value as it currently holds is detected and does not result in the generation of a KVP message.

The event log object includes a singleton attribute, event, that is defined of type Event, which is defined to include the subattributes time, type, and offset.

The event time subattribute specifies the time of the event.

The event type subattribute specifies the type of the event.

The event offset subattribute specifies the bytes written to event log 310 since the previous event in the log. This field allows the log to be read backwards, i.e., from a newer part of the log to an older portion of the log.

In an embodiment, the event offset field is omitted, thereby saving on the space required by this field. This omission means that it is not feasible to directly read the log backwards.

In an embodiment, the event type subattribute specifies a binary ID that has been previously defined to correspond to a type definition. This type definition defines the attributes specified in the event, with those designated as attribute entries defined in the event log object.

Delta Event Time and Epochs

In an embodiment, the event time is specified as the time delta relative to the previous event or the start of an epoch, whichever is later. The start of an epoch is designated by an event log object attribute epoch which specifies the absolute time of the start of an epoch. For example, if the epoch value is currently 12 am midnight and the event time is in microseconds, a value of 13 for the event time indicates an absolute time for the event as 13 microseconds past midnight. This delta representation reduces the size of the time field compared to using the absolute time. It further benefits from using a variable-size encoding of the field along the lines of the ASN.1 BER or Google's varInt representation. In particular, with rapid generation of events, as arises under significant system load, the time between events is reduced, reducing the size of the time field. In an embodiment, a new epoch is started, i.e., written, periodically so the absolute time of an event can be determined within a local portion of the event log. In an embodiment, the event log is partitioned across event log files that each represent a limited period of time, with each event log file containing an epoch message as the start of time.

IDs and ID Management

In an embodiment, a binary identifier can be used to efficiently identify an object, allowing an event to designate an associated object by reference. For example, an error event can be associated with a particular file system mount. By associating a binary ID with this mount, the event record can be represented more compactly compared to providing the full description of the mount.

The ID can also make it far easier to associate the end of this mount, or unmount event, with the original mount event.

Note: reference management of IDs is simplified because an object is not deleted from the log. The ID refers to the object last defined in the log with that ID.

In an embodiment, the event log object contains a singleton instantiationEvent attribute and a singleton deletionEvent attribute. The attribute type specifies the ID being associated with this new object in the case of instantiation, or disassociated with this object, in the case of deletion.

Type and TypeID as an Instance of ID

In some embodiments, a type is defined with a name, ID, baseTypeId, and a list of attributes. For example, an application may require a PurchaseOrder type that includes the following attributes:
purchaser
purchase order number
order number
date
dollar amount Each attribute is identified by an attributeId. The type definition includes an ID identifying each of these attributes, using the ID associated with this attribute from a previous definition of each attribute.

In an embodiment, a base set of attributeId's that are used across multiple applications and thus of general utility is predefined in the KVP protocol. For example, in an embodiment, attributes such as user, principal, processId, owner, permissions, and similar are predefined, given they are used in multiple applications with a common name, data type, and semantics.

The predefined attributes improve efficiency because they remove the need for applications to issue or record the definition. They also allow a general software library supporting event logging to directly support efficiently writing and reading back these predefined attribute value updates, as well as maintaining the state of such attributes. The definition of other attributes is described in the next subsection.

The attributes defined in the type identified by baseTypeId are logically included in this type, preceding its own attribute list, following the conventional inheritance model used in programming languages such as C++.

In an embodiment, a predefined KVP message is output to define a new type, with the message format including fields for each of the name, ID, baseTypeId and list of attribute IDs.

In an embodiment, a base set of typeId's is predefined. These types correspond to the built-in types in a programming language and thus include basic types such as byte, integer, character string, boolean, floating point number, and the like. The predefined types provide a basis for defining additional types using the above type-defining capability as well as for defining new attributes that are of one of these base types.

In an embodiment, the predefined types include commonly used types in event logging such as TypeId, AttributeId, TimeDelta, Severity, and others. Including commonly used types as predefined types reduces the development and processing overhead on applications to define these types.

In an embodiment, the (non-predefined) type definitions used by an event log are stored in a separate type definition file, allowing these types to be known without reading all the event log files, and without having to repeat these definitions at the start of each new event log, as part of log rotation.

In general, the combination of the above introspection support together with selected predefined types, attributes, and objects allows the event log capability to be both efficient as well as extensible.

Supporting Application-specific Attributes

An attribute is defined by specifying a name, an ID, a data typeId, and an index typeId (if a collection).

In an embodiment, a predefined KVP message is output to define a new attribute, with the message format including fields for each of the name, ID, data typeId and possibly index typeId. A receiver of this message, such as log processor 312, is expected to record the message.

In an embodiment, an attribute definition message is stored in a separate file from the event messages, similar to the reasons to store type definitions in a separate file. In an embodiment, both the type and attribute definitions are stored in the same file.

In an embodiment, a significant collection of attributes are predefined, as described earlier, reducing the overhead on applications to define these attributes at run-time.

Post-Processing

In an embodiment, a postprocessing software program, such as postprocessor software 322, reads the type and attribute definitions and then reads the sequence of messages to recreate the state of the attributes, extracting the relevant portions of this state on reading each EDM to determine the full event specification, then performing the desired event postprocessing.

For example, building on the earlier example of a PurchaseOrder, postprocessing software 322:

reads zero or more messages updating the attributes: purchaser, purchaseOrderNumber, orderNumber, date, and dollarAmount, saving each updated value in location associated with the specified attribute.

subsequently reads an EDM that specifies a new PurchaseOrder, with the EDM specifying the time of the event (possibly as a delta relative to the previous event) as well as the type of the event. (The type of the event indicates directly or indirectly that the event references a PurchaseOrder.)

reads the values that are stored in the KVS and associated with each of the attributes associated with the PurchaseOrder type to reconstruct the purchase order.

performs the desired postprocessing on the new PurchaseOrder event, using this reconstructed information. In one embodiment, this postprocessing can be simply translating such an event record into a sequence of conventional character string key-value pairs, for subsequent analytical processing by a batch application that expects this representation.

In another embodiment, the postprocessing can be performing analytics processing or alert detection on the post processor's interpretation of the event log contents directly. For example, the postprocessor may be tasked with simply summing up the total dollar amount of PurchaseOrder's received within a specified time interval. In this case, the postprocessing software 322 may skip each EDM that does not specify a new PurchaseOrder event and, on each PurchaseOrder event, only reads the value of the dollarAmount attribute.

In an embodiment, it is possible that one or more of the attributes do not need to change for this new PurchaseOrder. For example, the last purchase order could have been from the same purchaser. In this particular embodiment, event log 310 need not contain an attribute update message for this purchaser attribute. Postprocessor software 322 determines the correct value from its retained state for this attribute.

This suppression of KVAMs occurs where the user, severity, and transaction ID are explicitly transmitted in KVAMs along with the KVAM indicating the time before the first event's EDM, namely startTrans, but only a time KVAM and the EDM for endTrans are transmitted for the second event, because these earlier key-value pair values, implicitly part of both events, have not changed since the first event.

In an embodiment, an object ID is specified as part of the key in a KVAM which identifies an object with a known type, so the type is effectively and indirectly identified by the object ID. That is, the type is not necessarily specified explicitly in an EDM or KVAM.

The key benefits of this application include efficient generation, space-efficiency, and extensible yet sufficiently structured to allow extensive data mining.

Extensible and Data Mining

The event log is extensible along various dimensions. First, new event types can be defined by defining new event types. These extensions can occur dynamically at run-time, i.e., during the execution of the application. Second, additional attributes or key-value pairs can be added to an existing event to expand its description. Finally, new application types and objects can be specified at run-time and then referenced in the event log.

In general, the type, attribute, and object definitional capability provided in this application and the fact that an event can be described by a multiplicity of messages as well as KVS state together with predefined types, attributes, and objects of common use means that the event log of this application can be highly extensible yet efficient in space and processing.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    obtaining a key-value assignment message (KVAM) that comprises a key and one or more values, wherein the key-value assignment message is sent from a computer system having a first key-value store;
    determining whether the key of the key-value assignment message corresponds to an event designating key;
    in response to a determination that the key of the key-value assignment message corresponds to the event designating key, looking up, in a second key-value store, a set of keys referenced by the one or more values included in the key-value assignment message, wherein the set of keys have corresponding values; and
    constructing an event associated with the computer system using the set of keys and their corresponding values.

2. The method of claim 1, wherein the obtaining the KVAM further includes accessing a log comprising one or more KVAMs.

3. The method of claim 2, wherein the log is used as an event log recording event information and a recovery log recording state information.

4. The method of claim 2, wherein the log allows the second key-value store to be resynchronized with the first key-value store of the computer system after a connection failure between the computer system and a receiver storing the second key-value store.

5. The method of claim 1, wherein the key is represented as a binary identifier.

6. The method of claim 1, wherein the KVAM specifies a type or time of the event.

7. The method of claim 1, further comprising outputting the constructed event.

8. The method of claim 1, wherein
the KVAM is obtained from a log comprising one or more KVAMs, and further comprising updating the second key-value store based at least in part on a key of the one of the one or more KVAMs and a value corresponding to the key of the one of the one or more KVAMs.

9. The method of claim 1, wherein the KVAM includes a header that indicates whether a key-value pair associated with a set of keys or a type designation will be included in the KVAM.

10. The method of claim 9, wherein constructing the event further comprises using at least a stored value associated with the key-value pair when the header indicates that the key-value pair is not to be included in the KVAM.

11. The method of claim 1, wherein the event is specified in the KVAM as a time delta relative to a previous event or a start of an epoch.

12. The method of claim 1, further comprising defining a key-value protocol, wherein the key-value protocol defines introspection messages.

13. The method of claim 1, wherein the KVAM is associated with one or more key-value assignment messages that occurred after a previous event designating message.

14. The method of claim 1, wherein the KVAM is associated with one or more key-value assignment messages that occur after a previous event designating message and before a subsequent event designating message.

15. The method of claim 1, wherein the second key-value store is a copy of the first key-value store.

16. A system, comprising:
    one or more processors configured to:
        obtain a key-value assignment message that comprises a key and one or more values, wherein the key-value assignment message is sent from a computer system having a first key-value store;
        determine whether the key of the key-value assignment message corresponds to an event designating key;
        in response to a determination that the key of the key-value assignment message corresponds to the event designating key, look up, in a second key-value store a set of keys referenced by the one or more values included in the key-value assignment message, wherein the set of keys have corresponding values; and
        construct an event associated with the system using the set of keys and their corresponding values; and
    one or more memories configured to provide the one or more processors with instructions.

17. The system of claim 16, wherein to obtain the KVAM further includes to access a log comprising one or more KVAMs.

18. The system of claim 17, wherein the log is used as an event log recording event information and a recovery log recording state information.

19. A computer program product, the computer program product being embodied in a non-transitory computer readable storage medium and comprising computer instructions for:
    obtaining a key-value assignment message that comprises a key and one or more values, wherein the key-value assignment message is sent from a computer system having a first key-value store;
    determining whether the key of the key-value assignment message corresponds to an event designating key;
    in response to a determination that the key of the key-value assignment message corresponds to the event designating key, looking up, in a second key-value store, a set of keys referenced by the one or more values included in the key-value assignment message, wherein the set of keys have corresponding values; and constructing an event associated with the computer system using the set of keys and their corresponding values.

\* \* \* \* \*